(12) United States Patent
Brinkman et al.

(10) Patent No.: US 11,745,705 B2
(45) Date of Patent: Sep. 5, 2023

(54) SYSTEMS FOR ANTI-LOCK BRAKING FOR A TOW VEHICLE

(71) Applicant: GM GLOBAL TECHNOLOGY OPERATIONS LLC, Detroit, MI (US)

(72) Inventors: Todd J. Brinkman, Rochester Hills, MI (US); Edward T. Heil, Howell, MI (US); Douglas J. Spry, Auburn Hills, MI (US); Steven G. Reini, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 385 days.

(21) Appl. No.: 17/102,983

(22) Filed: Nov. 24, 2020

(65) Prior Publication Data

US 2022/0161770 A1     May 26, 2022

(51) Int. Cl.
| | |
|---|---|
| *B60T 8/17* | (2006.01) |
| *B60T 13/66* | (2006.01) |
| *B60T 8/88* | (2006.01) |
| *B60T 8/32* | (2006.01) |

(52) U.S. Cl.
CPC ............ *B60T 8/1708* (2013.01); *B60T 8/323* (2013.01); *B60T 8/885* (2013.01); *B60T 13/662* (2013.01)

(58) Field of Classification Search
CPC ...... B60T 8/1708; B60T 13/662; B60T 8/885; B60T 8/323; B60T 7/20; B60T 8/1887
See application file for complete search history.

(56) References Cited

U.S. PATENT DOCUMENTS

| | | | | | |
|---|---|---|---|---|---|
| 5,130,928 | A | * | 7/1992 | Petersen ............ | B60K 23/0808 180/197 |
| 9,016,807 | B1 | * | 4/2015 | Pieronek ................. | B60T 8/171 303/3 |
| 10,807,580 | B2 | * | 10/2020 | Hunt ....................... | B60T 8/323 |
| 10,946,842 | B2 | * | 3/2021 | Williams .............. | B60T 13/683 |

OTHER PUBLICATIONS

European Patent No. EP 1442953 published Aug. 4, 2004.*
German Patent No. DE 102012012710 published Jan. 23, 2014 to Risse et al.*
Chinese Patent No. CN 114475544 published May 13, 2022 to Xu et al.*

* cited by examiner

*Primary Examiner* — Pamela Rodriguez
(74) *Attorney, Agent, or Firm* — Quinn IP Law

(57) ABSTRACT

An anti-lock braking system for a triple axle trailer having three axles and six wheels is disclosed. The system includes a first wheel speed sensor coupled to the first wheel of the trailer, a second wheel speed sensor coupled to the third wheel of the trailer, a spring mount pivotably coupled to the body of the trailer, a first suspension member coupled to the first wheel and to the spring mount and a second suspension member coupled to the second wheel and to the spring mount. The system includes a hydraulic braking actuator having a first channel coupled to the first wheel and the second wheel and a second channel coupled to the third wheel. The spring mount pivots in response to an applied brake torque to increase a normal force applied to the second wheel as compared to a normal force applied to the first wheel.

20 Claims, 3 Drawing Sheets

SYSTEMS FOR ANTI-LOCK BRAKING FOR A TOW VEHICLE

INTRODUCTION

The present disclosure relates generally to an anti-lock braking system for a towed vehicle, such as a triple axle trailer.

An anti-lock braking system (ABS) is an anti-skid braking system that operates by preventing the wheels of a vehicle from locking up during braking, thereby maintaining tractive contact with the road surface such that the operator retains greater control over the vehicle. Anti-lock braking systems include a control unit, wheel speed sensors, and a hydraulic braking actuator. Current anti-lock brake systems for towed vehicle, such as trailers, utilize a separate hydraulic line and channel for each wheel, as well as separate wheel speed sensors connected to each wheel.

SUMMARY

Embodiments according to the present disclosure provide a number of advantages. For example, embodiments according to the present disclosure enable use of a common hydraulic channel for the front and center wheels of the triple axle trailer. This enables use of an anti-lock braking system (ABS) actuator that has been designed for a four-wheeled vehicle to provide anti-lock braking on a triple axle trailer having six wheels.

In one aspect of the present disclosure, an anti-lock braking system for a triple axle trailer is disclosed. The trailer has a body, a first wheel coupled to a first axle, a second wheel coupled to a second axle, and a third wheel coupled to a third axle. Each of the first, second, and third axles are coupled to the body and positioned along a longitudinal axis of the trailer. The system includes a first wheel speed sensor coupled to the first wheel, a second wheel speed sensor coupled to the third wheel, a spring mount pivotably coupled to the body, a first suspension member coupled to the first wheel and to the spring mount, a second suspension member coupled to the second wheel and to the spring mount, and a hydraulic braking actuator having a first channel coupled to the first wheel and the second wheel and a second channel coupled to the third wheel. The spring mount pivots in response to an applied brake torque to increase a normal force applied to the second wheel as compared to a normal force applied to the first wheel.

In some aspects, the anti-lock braking system further includes a controller in electronic communication with the hydraulic braking actuator and the first and second wheel speed sensors. The controller is configured to receive sensor data from each of the first and second wheel speed sensors, analyze the sensor data, determine a first braking pressure corresponding to the first channel of the hydraulic braking actuator and a second braking pressure corresponding to the second channel of the hydraulic braking actuator, and control the hydraulic braking actuator to apply the first and second braking pressures.

In some aspects, the trailer further includes a fourth wheel coupled to the first axle, a fifth wheel coupled to the second axle, and a sixth wheel coupled to the third axle.

In some aspects, the anti-lock braking system further includes a third wheel speed sensor coupled to the fourth wheel and a fourth wheel speed sensor coupled to the sixth wheel and each of the third and fourth wheel speed sensors is in electronic communication with the controller.

In some aspects, the hydraulic braking actuator further includes a third channel coupled to the fourth wheel and the fifth wheel and a fourth channel coupled to the sixth wheel.

In some aspects, the spring mount includes a first spring mount positioned between the first wheel and the second wheel and a second spring mount positioned between the fourth wheel and the fifth wheel.

In some aspects, the first spring mount pivots in response to a brake torque applied at the first wheel to increase a normal force on the second wheel and the second spring mount pivots in response to a brake torque applied at the fourth wheel to increase a normal force on the fifth wheel.

In some aspects, the spring mount is pivotably coupled to the body at a fixed point and rotates about the fixed point upon application of the applied brake torque to the first and second wheels.

In another aspect of the present disclosure, an anti-lock braking system for a triple axle trailer is disclosed. The trailer has a first wheel and a second wheel coupled to a first axle, a third wheel and a fourth wheel coupled to a second axle, and a fifth wheel and a sixth wheel coupled to a third axle. Each of the first, second, and third axles are positioned along a longitudinal axis of the trailer. The system includes a first wheel speed sensor coupled to the first wheel, a second wheel speed sensor coupled to the second wheel, a third wheel speed sensor coupled to the fifth wheel, and a fourth wheel speed sensor coupled to the sixth wheel. The system also includes a hydraulic braking actuator having a first channel, a second channel, a third channel, and a fourth channel and a controller in electronic communication with the hydraulic braking actuator and the first, second, third, and fourth wheel speed sensors. The controller is configured to receive sensor data from each of the first, second, third, and fourth wheel speed sensors. The controller is configured to analyze the sensor data and determine a first braking pressure corresponding to the first channel of the hydraulic braking actuator, a second braking pressure corresponding to the second channel of the hydraulic braking actuator, a third braking pressure corresponding to the third channel of the hydraulic braking actuator, and a fourth braking pressure corresponding to the fourth channel of the hydraulic braking actuator. The controller is further configured to control the hydraulic braking actuator to apply the first, second, third, and fourth braking pressures.

In some aspects, the anti-lock braking system further includes a first spring mount positioned between the first wheel and the third wheel and coupled to the first wheel via a first leaf spring and to the third wheel via a second leaf spring and a second spring mount positioned between the second wheel and the fourth wheel and coupled to the second wheel via a third leaf spring and to the fourth wheel via a fourth leaf spring. The first spring mount pivots in response to an applied brake torque to increase a normal force applied to the third wheel as compared to a normal force applied to the first wheel and the second spring mount pivots in response to an applied brake torque to increase a normal force applied to the fourth wheel as compared to a normal force applied to the second wheel.

In some aspects, the hydraulic braking actuator includes a first hydraulic line connecting the first channel of the hydraulic braking actuator and the first and third wheels, a second hydraulic line connecting the second channel of the hydraulic braking actuator and the second and fourth wheels, a third hydraulic line connecting the third channel of the hydraulic braking actuator and the fifth wheel, and a fourth hydraulic line connecting the fourth channel of the hydraulic braking actuator and the sixth wheel.

In some aspects, the first wheel and the third wheel are on opposite sides of the triple axle trailer and the second wheel and the fourth wheel are on opposite sides of the triple axle trailer.

In some aspects, the first wheel and the third wheel are on a first side of the triple axle trailer and the second wheel and the fourth wheel are on a second side of the triple axle trailer opposite the first side of the triple axle trailer.

In another aspect of the present disclosure, a triple axle trailer includes a body, a first axle coupled to the body, a second axle coupled to the body and positioned longitudinally behind the first axle, and a third axle coupled to the body and positioned longitudinally behind the second axle. The triple axle trailer also includes a first wheel coupled to the first axle, a second wheel coupled to the second axle, a third wheel coupled to the third axle, and an anti-lock braking system. The anti-lock braking system includes a first wheel speed sensor coupled to the first wheel, a second wheel speed sensor coupled to the third wheel, a spring mount pivotably coupled to the body; and a hydraulic braking actuator having a first channel coupled to the first wheel and the second wheel and a second channel coupled to the third wheel. The spring mount pivots in response to a braking pressure applied to the first and second wheels to increase a normal force applied to the second wheel as compared to a normal force applied to the first wheel.

In some aspects, the triple axle trailer further includes a controller in electronic communication with the hydraulic braking actuator and the first and second wheel speed sensors. The controller is configured to receive sensor data from each of the first and second wheel speed sensors, analyze the sensor data and determine a first braking pressure corresponding to the first channel of the hydraulic braking actuator and a second braking pressure corresponding to the second channel of the hydraulic braking actuator, and control the hydraulic braking actuator to apply the first and second braking pressures.

In some aspects, the first wheel and the second wheel are on opposite sides of the body.

In some aspects, the first wheel and the second wheel are on a same side of the body.

In some aspects, the triple axle trailer further includes a fourth wheel coupled to the first axle, a fifth wheel coupled to the second axle, and a sixth wheel coupled to the third axle.

In some aspects, the triple axle trailer further includes a third wheel speed sensor coupled to the fourth wheel and a fourth wheel speed sensor coupled to the sixth wheel and the hydraulic braking actuator further includes a third channel coupled to the fourth wheel and the fifth wheel and a fourth channel coupled to the sixth wheel In some aspects, the spring mount includes a first spring mount positioned between the first wheel and the second wheel and a second spring mount positioned between the fourth wheel and the fifth wheel and the first spring mount pivots in response to a brake torque applied at the first wheel to increase a normal force on the second wheel and the second spring mount pivots in response to a brake torque applied at the fourth wheel to increase a normal force on the fifth wheel.

BRIEF DESCRIPTION OF THE DRAWINGS

The present disclosure will be described in conjunction with the following figures, wherein like numerals denote like elements.

Figure 1:
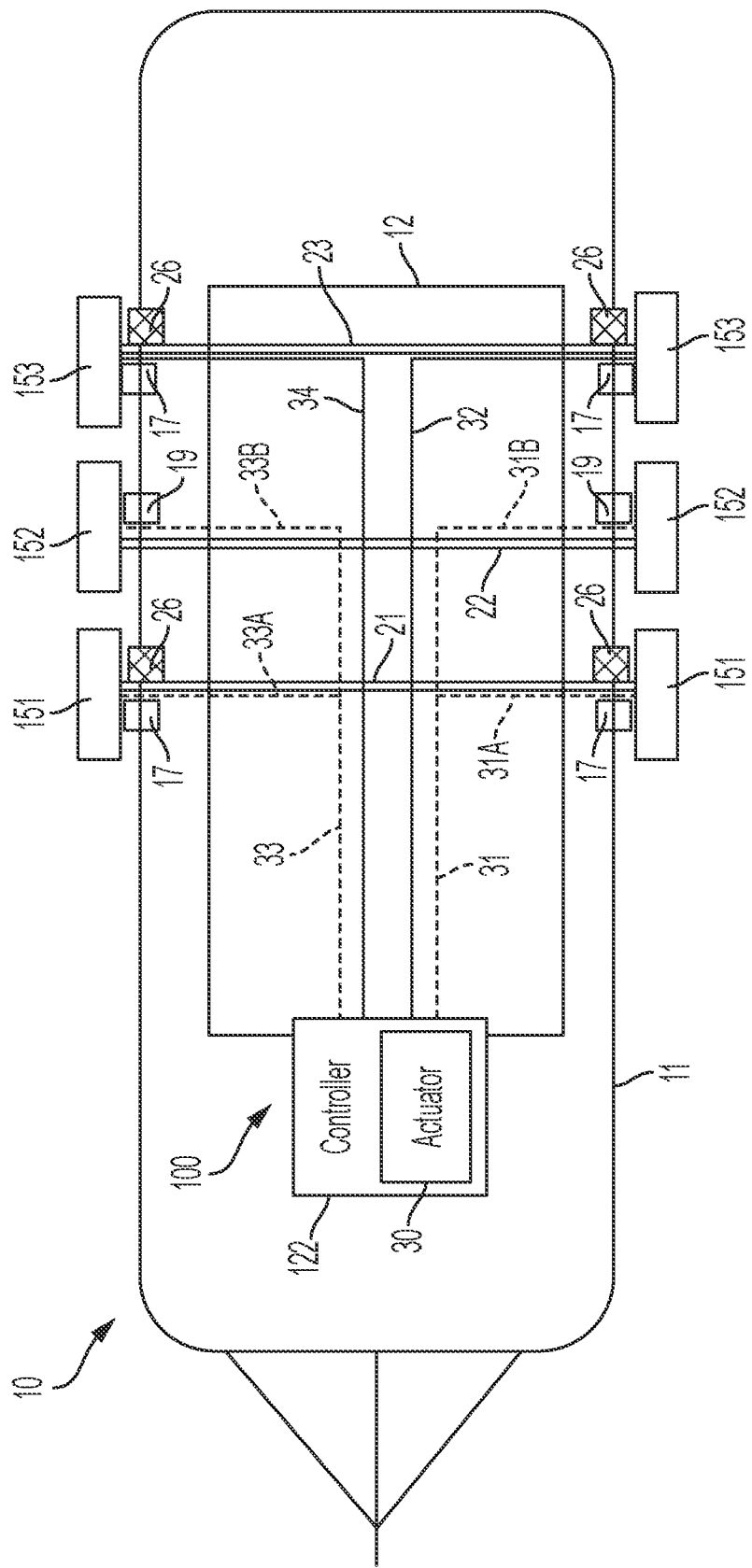
FIG. 1 is a schematic overhead view illustration of a triple axle trailer with an ABS system, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

The anti-lock braking systems disclosed herein utilize a common hydraulic circuit for the front and center wheels of each side of a triple axle trailer. The rear wheels are on separate hydraulic circuits. This allows a four channel anti-lock braking system (ABS) actuator to be used to control the braking of the six wheels of the triple axle trailer. The front and rear wheels include wheel speed sensors. An articulating spring mount coupling the front and center wheels of each side of the trailer ensures that the normal force at the center wheel exceeds the normal force at the front wheel during a braking event, such that the center wheel will not lock up prior to the front wheel.

Figure 2:
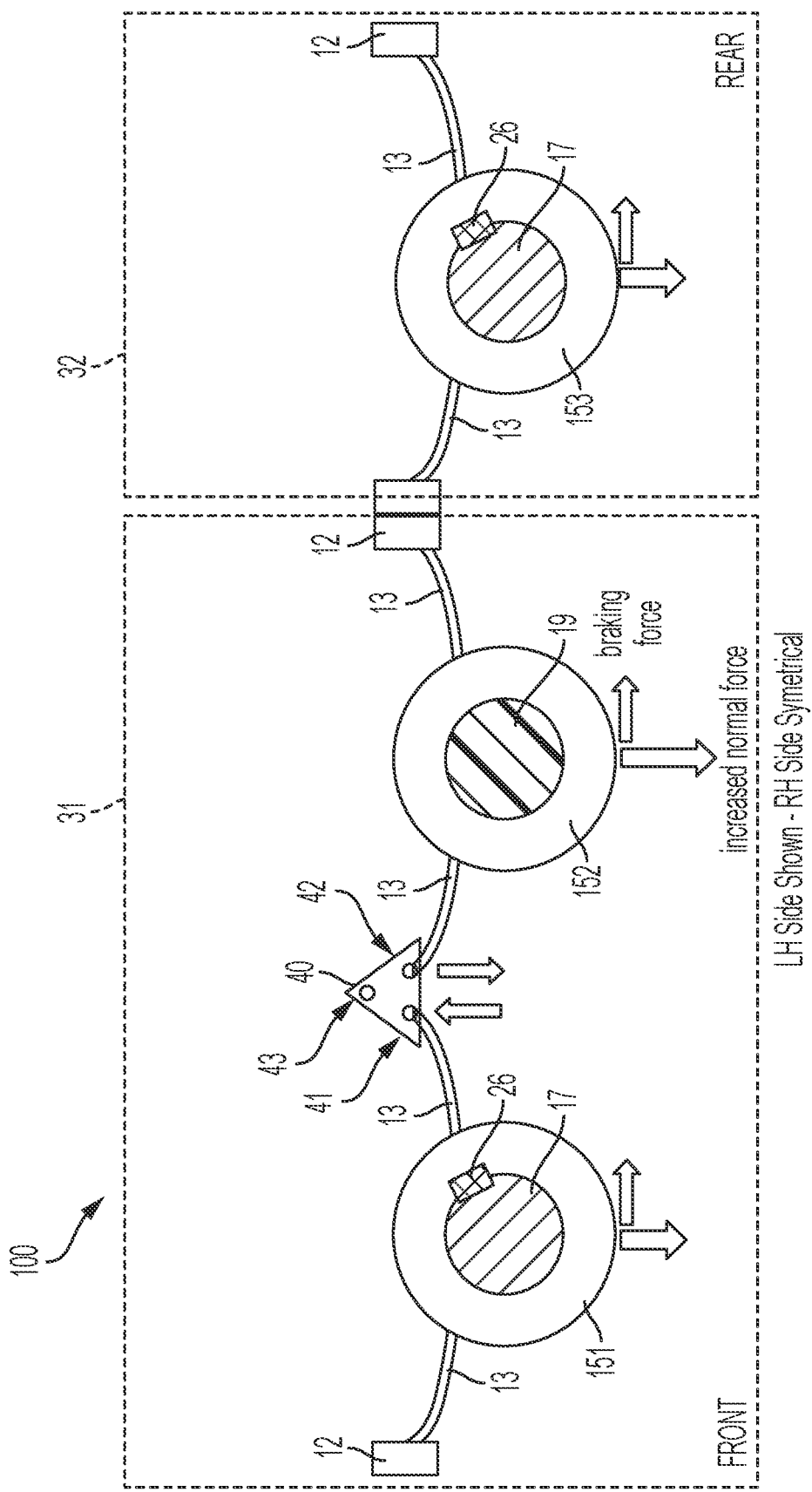
FIG. 2 is a schematic side view illustration of a triple axle trailer with an ABS system, according to an embodiment.

FIGS. 1 and 2 illustrate schematic views of a triple axle trailer 10 that includes an anti-lock braking system 100, according to an embodiment. The triple axle trailer 10 includes a body 11 coupled to a frame 12. The triple axle trailer 10 includes a first axle 21, a second axle 22, and a third axle 23. Each of the first, second, and third axles 21, 22, 23 are coupled to the frame 12. A set of wheels is coupled to each end of the first, second, and third axles 21, 22, 23. As used herein, the front wheel or wheels 151 refer to the wheels coupled to the first axle 21, the center wheel or wheels 152 refer to the wheels coupled to the second axle 22, and the rear wheel or wheels 153 refer to the wheels coupled to the third axle 23.

The anti-lock braking system 100 includes a plurality of anti-lock brakes 17 and a plurality of wheel speed sensors 26 coupled with a controller 122 that includes or is in electronic communication with a hydraulic brake actuator 30. An anti-lock brake 17 is coupled to each of the wheels 151 coupled to the first axle 21 and to each of the wheels 153 coupled to the third axle 23. A passive brake 19 is coupled to each of the wheels 152 coupled to the second axle 22. The anti-lock brakes 17 and the passive brakes 19 may, in various embodiments, include friction brakes and/or other appropriate braking mechanisms. A wheel speed sensor 26 is coupled to each of the front wheels 151 and each of the rear wheels 153.

The anti-lock braking system 100 also includes a spring mount 40, as shown in FIG. 2. The spring mount 40 is pivotably coupled to the frame 12 at a pivot point 43. The spring mount 40 is positioned between the front wheel 151 and the center wheel 152 on each side of the trailer 10. A suspension component 13, such as a leaf spring, couples the front wheel 151 with the frame 12 and the spring mount 40. Similarly, another suspension component 13, such as a leaf spring, couples the center wheel 152 with the frame 12 and the spring mount 40. The suspension components 13 are coupled at one end to the frame 12 and at another end to the spring mount 40. As shown in FIG. 2, the suspension component 13 coupled to the front wheel 151 is coupled to the spring mount 40 at a first connection 41 and the suspension component 13 coupled to the center wheel 152 is coupled to the spring mount 40 at a second connection 42.

The spring mount 40 pivots such that the first connection 41 rises as the second connection 42 lowers, and vice versa. The spring mount 40 pivots in response to an applied brake torque to the front and center wheels 151, 152. As the brake torque is applied, the spring mount 40 pivots such that the second connection 42 is lower than the first connection 41. This applies a greater normal force on the center wheel 152 relative to the front wheel 151. The increased normal force applied on the center wheel 152 prevents the center wheel 152 from locking prior to the front wheel 151. As a result, the anti-lock braking system 100 does not include a wheel speed sensor at the center wheel 152, nor a separate hydraulic connection to the ABS actuator, as discussed in greater detail herein.

As discussed above, the triple axle trailer 10 also includes at least one controller 122. The controller 122 is in electronic communication with each of the wheel speed sensors 26. The controller 122 includes an anti-lock braking system (ABS) actuator 30. The ABS actuator 30 is a four-channel hydraulic braking actuator, such as, for example, an ABS actuator designed for use with a four-wheeled vehicle.

The ABS actuator 30 includes a first hydraulic line 31, a second hydraulic line 32, a third hydraulic line 33, and a fourth hydraulic line 34. Each of the first, second, third, and fourth hydraulic lines corresponds with one of the four channels of the ABS actuator 30. The first hydraulic line 31 is operatively coupled with the front wheel 151 and the center wheel 152 of one side of the trailer 10 via the hydraulic lines 31A, 31B. The second hydraulic line 32 is operatively coupled with the rear wheel 153 of one side of the trailer 10. Similarly, the third hydraulic line 33 is operatively coupled with the front wheel 151 and the center wheel 152 of the opposite side of the trailer 10 via the hydraulic lines 33A, 33B. The fourth hydraulic line 34 is operatively coupled with the rear wheel 153 on the opposite side of the trailer 10.

While depicted as a single unit for illustrative purposes, the controller 122 may additionally include one or more other controllers, collectively referred to as a "controller." The controller 122 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 122 in controlling the trailer braking.

The controller 122 constantly monitors the rotational speed of the front and rear wheels 151, 153 via the wheel speed sensors 26. During a braking event, the spring mount 40 simultaneously and passively reacts to the brake torque by pivoting in a first direction such that an increased normal force is applied to the center wheel 152. When the controller 122 detects the front wheel 151 rotating significantly slower than the speed of the trailer 10, a condition indicative of impending wheel lock, the controller 122 actuates the valves of the ABS actuator 30 to reduce hydraulic pressure to the brake 17 at the affected front wheel 151, thus reducing the braking force on the front wheel 151, allowing the front wheel 151 to rotate faster. When the braking event has ended, the spring mount 40 pivots in the second or opposite direction to reduce the normal force applied to the center wheel 152.

Conversely, when the controller 122 detects a wheel speed of a wheel converging with the speed of the trailer 10, the controller 122 increases brake hydraulic pressure via the ABS actuator 30 so that braking force is increased or reapplied to the affected wheel, thus slowing down the wheel. This process is repeated continuously, with the spring mount 40 reacting to increase or decrease the normal force applied to the center wheel 152 to prevent the center wheel 152 from locking prior to either the front wheel 151 or the rear wheel 153. The reaction of the spring mount 40 to the rotational speed changes of the front wheel 151 result in anti-lock braking performance for a six-wheeled vehicle while using only four wheel speed sensors 26 and a four-channel ABS actuator 30.

Figure 3:
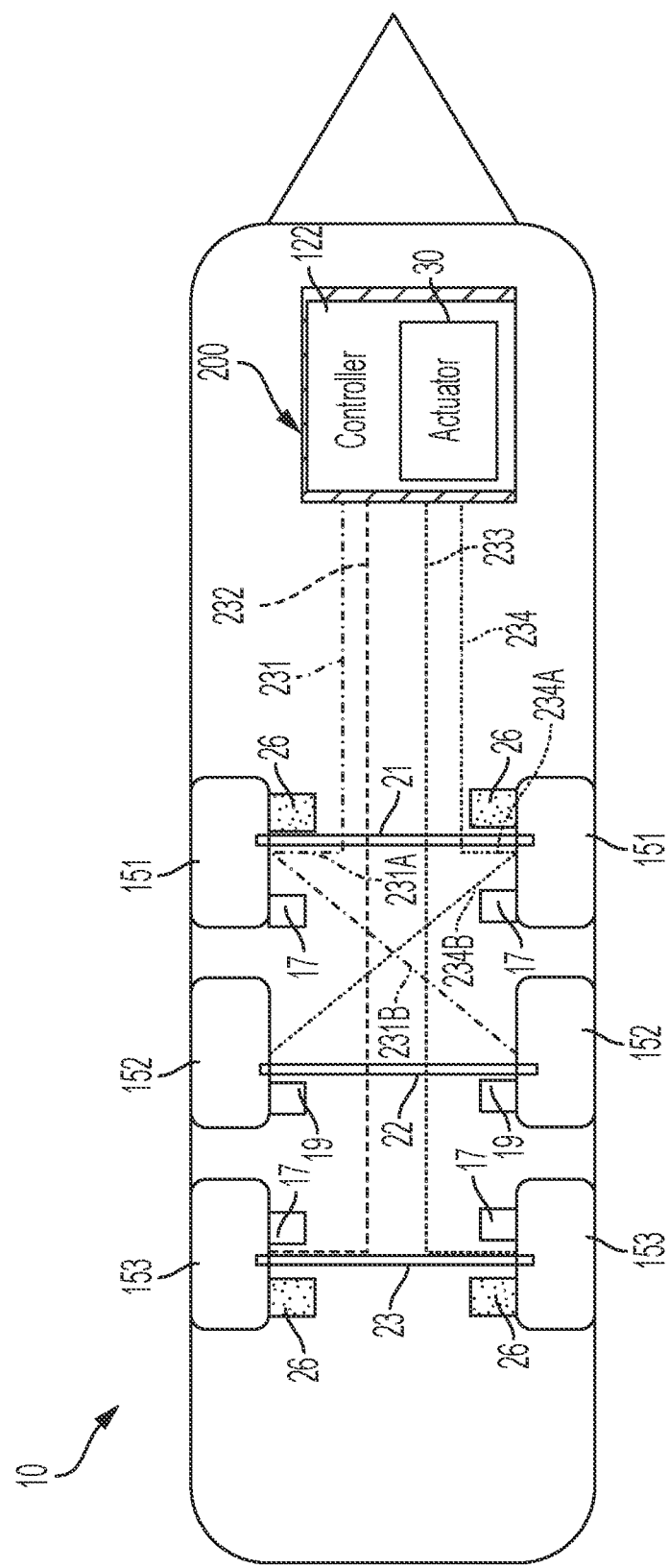
FIG. 3 is a schematic overhead view illustration of a triple axle trailer with an ABS system, according to another embodiment.

FIG. 3 illustrates a schematic view of a triple axle trailer 10 that includes an anti-lock braking system 200, according to an embodiment. Similar to the embodiment shown in FIGS. 1 and 2, the triple axle trailer 10 includes a first axle 21, a second axle 22, and a third axle 23. A set of wheels are coupled to each end of the first, second, and third axles 21, 22, 23. As used herein, the front wheel or wheels 151 refer to the wheels coupled to the first axle 21, the center wheel or wheels 152 refer to the wheels coupled to the second axle 22, and the rear wheel or wheels 153 refer to the wheels coupled to the third axle 23.

The anti-lock braking system 200 includes a plurality of anti-lock brakes 17 and a plurality of wheel speed sensors 26 coupled with a controller 122 that includes or is in electronic communication with a hydraulic brake actuator 30 and the plurality of wheel speed sensors 26. An anti-lock brake 17 is coupled to each of the front wheels 151 coupled to the first axle 21 and to each of the rear wheels 153 coupled to the third axle 23. A passive brake 19 is coupled to each of the center wheels 152 coupled to the second axle 22. The anti-lock brakes 17 and the passive brakes 19 may, in various embodiments, include friction brakes and/or other appropriate braking mechanisms. A wheel speed sensor 26 is coupled to each of the front wheels 151 and each of the rear wheels 153.

The ABS actuator 30 is a four-channel hydraulic braking actuator, such as, for example, an ABS actuator designed for use with a four-wheeled vehicle. The ABS actuator 30 includes a first hydraulic line 231, a second hydraulic line 232, a third hydraulic line 233, and a fourth hydraulic line 234. Each of the first, second, third, and fourth hydraulic lines corresponds with one of the four channels of the ABS actuator 30. The first hydraulic line 231 is operatively coupled with the front wheel 151 of one side of the trailer 10 and the center wheel 152 of the opposite side of the trailer 10 via the hydraulic lines 231A, 231B. The second hydraulic line 232 is operatively coupled with the rear wheel 153 of one side of the trailer 10. Similarly, the third hydraulic line 233 is operatively coupled with the rear wheel 153 on the opposite side of the trailer 10. The fourth hydraulic line 234 is operatively coupled with the front wheel 151 of one side of the trailer 10 and the center wheel 152 of the opposite side of the trailer 10 via the hydraulic lines 234A, 234B.

The hydraulic plumbing shown in FIG. 3 is an alternate plumbing solution to that shown in FIG. 1. The anti-lock braking system 200 provides the same benefits as the anti-lock braking system 100, that is, utilizing a common hydraulic circuit for the front and center wheels of the triple axle trailer 10. The rear wheels are on separate hydraulic circuits. This allows the four channel ABS actuator 30 to be used to control the braking of the six wheels of the triple axle trailer 10. While not shown in FIG. 3, the anti-lock braking system 200 includes a spring mount, similar to the spring mount 40, coupled between the front and center wheels 151, 152 of each side of the trailer 10.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An anti-lock braking system for a triple axle trailer having a body, a first wheel coupled to a first axle, a second wheel coupled to a second axle, and a third wheel coupled to a third axle, and each of the first, second, and third axles are coupled to the body and positioned along a longitudinal axis of the trailer, the system comprising:
a first wheel speed sensor coupled to the first wheel;
a second wheel speed sensor coupled to the third wheel;
a spring mount pivotably coupled to the body;
a first suspension member coupled to the first wheel and to the spring mount;
a second suspension member coupled to the second wheel and to the spring mount; and
a hydraulic braking actuator having a first channel coupled to the first wheel and the second wheel and a second channel coupled to the third wheel;
wherein the spring mount pivots in response to an applied brake torque to increase a normal force applied to the second wheel as compared to a normal force applied to the first wheel.

2. The anti-lock braking system of claim 1 further comprising a controller in electronic communication with the hydraulic braking actuator and the first and second wheel speed sensors, the controller configured to receive sensor data from each of the first and second wheel speed sensors, analyze the sensor data, and determine a first braking pressure corresponding to the first channel of the hydraulic braking actuator and a second braking pressure corresponding to the second channel of the hydraulic braking actuator, and control the hydraulic braking actuator to apply the first and second braking pressures.

3. The anti-lock braking system of claim 2, wherein the trailer further comprises a fourth wheel coupled to the first axle, a fifth wheel coupled to the second axle, and a sixth wheel coupled to the third axle.

4. The anti-lock braking system of claim 3 further comprising a third wheel speed sensor coupled to the fourth wheel and a fourth wheel speed sensor coupled to the sixth wheel and each of the third and fourth wheel speed sensors is in electronic communication with the controller.

5. The anti-lock braking system of claim 4, wherein the hydraulic braking actuator further includes a third channel coupled to the fourth wheel and the fifth wheel and a fourth channel coupled to the sixth wheel.

6. The anti-lock braking system of claim 5, wherein the spring mount includes a first spring mount positioned between the first wheel and the second wheel and a second spring mount positioned between the fourth wheel and the fifth wheel.

7. The anti-lock braking system of claim 6, wherein the first spring mount pivots in response to a brake torque applied at the first wheel to increase a normal force on the second wheel and the second spring mount pivots in response to a brake torque applied at the fourth wheel to increase a normal force on the fifth wheel.

8. The anti-lock brake system of claim 1, wherein the spring mount is pivotably coupled to the body at a fixed point and rotates about the fixed point upon application of the applied brake torque to the first and second wheels.

9. An anti-lock braking system for a triple axle trailer having a first wheel and a second wheel coupled to a first axle, a third wheel and a fourth wheel coupled to a second axle, and a fifth wheel and a sixth wheel coupled to a third axle, and each of the first, second, and third axles are positioned along a longitudinal axis of the trailer, the system comprising:
a first wheel speed sensor coupled to the first wheel;
a second wheel speed sensor coupled to the second wheel;
a third wheel speed sensor coupled to the fifth wheel;
a fourth wheel speed sensor coupled to the sixth wheel;
a hydraulic braking actuator having a first channel, a second channel, a third channel, and a fourth channel, wherein the hydraulic braking actuator includes a first hydraulic line connecting the first channel of the hydraulic braking actuator and the first and third wheels, a second hydraulic line connecting the second channel of the hydraulic braking actuator and the second and fourth wheels, a third hydraulic line connecting the third channel of the hydraulic braking actuator and the fifth wheel, and a fourth hydraulic line connecting the fourth channel of the hydraulic braking actuator and the sixth wheel;
a controller in electronic communication with the hydraulic braking actuator and the first, second, third, and fourth wheel speed sensors, the controller configured to:
receive sensor data from each of the first, second, third, and fourth wheel speed sensors;
analyze the sensor data and determine a first braking pressure corresponding to the first channel of the hydraulic braking actuator, a second braking pressure corresponding to the second channel of the hydraulic braking actuator, a third braking pressure corresponding to the third channel of the hydraulic braking actuator, and a fourth braking pressure corresponding to the fourth channel of the hydraulic braking actuator; and
control the hydraulic braking actuator to apply the first, second, third, and fourth braking pressures.

10. The anti-lock braking system of claim 9 further comprising a first spring mount positioned between the first wheel and the third wheel and coupled to the first wheel via a first leaf spring and to the third wheel via a second leaf spring and a second spring mount positioned between the second wheel and the fourth wheel and coupled to the second wheel via a third leaf spring and to the fourth wheel via a fourth leaf spring, wherein the first spring mount pivots in response to an applied brake torque to increase a normal force applied to the third wheel as compared to a normal force applied to the first wheel and the second spring mount pivots in response to an applied brake torque to increase a normal force applied to the fourth wheel as compared to a normal force applied to the second wheel.

11. The anti-lock braking system of claim 9, wherein the first wheel and the third wheel are on opposite sides of the triple axle trailer and the second wheel and the fourth wheel are on opposite sides of the triple axle trailer.

12. The anti-lock braking system of claim 9, wherein the first wheel and the third wheel are on a first side of the triple axle trailer and the second wheel and the fourth wheel are on a second side of the triple axle trailer opposite the first side of the triple axle trailer.

13. The anti-lock braking system of claim 9 further comprising:
a spring mount pivotably coupled to the trailer;
a first suspension member coupled to the first wheel and to the spring mount; and
a second suspension member coupled to the second wheel and to the spring mount;
wherein the spring mount pivots in response to an applied brake torque to increase a normal force applied to the second wheel as compared to a normal force applied to the first wheel.

14. A triple axle trailer, comprising:
a body;
a first axle coupled to the body;
a second axle coupled to the body and positioned longitudinally behind the first axle;
a third axle coupled to the body and positioned longitudinally behind the second axle;
a first wheel coupled to the first axle;
a second wheel coupled to the second axle;
a third wheel coupled to the third axle; and
an anti-lock braking system, comprising:
 a first wheel speed sensor coupled to the first wheel;
 a second wheel speed sensor coupled to the third wheel;
 a spring mount pivotably coupled to the body; and
 a hydraulic braking actuator having a first channel coupled to the first wheel and the second wheel and a second channel coupled to the third wheel;
wherein the spring mount pivots in response to a braking pressure applied to the first and second wheels to increase a normal force applied to the second wheel as compared to a normal force applied to the first wheel.

15. The triple axle trailer of claim 14 further comprising a controller in electronic communication with the hydraulic braking actuator and the first and second wheel speed sensors, the controller configured to receive sensor data from each of the first and second wheel speed sensors, analyze the sensor data and determine a first braking pressure corresponding to the first channel of the hydraulic braking actuator and a second braking pressure corresponding to the second channel of the hydraulic braking actuator, and control the hydraulic braking actuator to apply the first and second braking pressures.

16. The triple axle trailer of claim 14, wherein the first wheel and the second wheel are on opposite sides of the body.

17. The triple axle trailer of claim 14, wherein the first wheel and the second wheel are on a same side of the body.

18. The triple axle trailer of claim 14 further comprising a fourth wheel coupled to the first axle, a fifth wheel coupled to the second axle, and a sixth wheel coupled to the third axle.

19. The triple axle trailer of claim 18 further comprising a third wheel speed sensor coupled to the fourth wheel and a fourth wheel speed sensor coupled to the sixth wheel and the hydraulic braking actuator further includes a third channel coupled to the fourth wheel and the fifth wheel and a fourth channel coupled to the sixth wheel.

20. The triple axle trailer of claim 19, wherein the spring mount includes a first spring mount positioned between the first wheel and the second wheel and a second spring mount positioned between the fourth wheel and the fifth wheel and the first spring mount pivots in response to a brake torque applied at the first wheel to increase a normal force on the second wheel and the second spring mount pivots in response to a brake torque applied at the fourth wheel to increase a normal force on the fifth wheel.

* * * * *